US005718028A

United States Patent [19]

Hasenberg

[11] Patent Number: 5,718,028

[45] Date of Patent: Feb. 17, 1998

[54] BICYCLE CRANK ARM PULLER

[75] Inventor: Mark J. Hasenberg, Kenosha, Wis.

[73] Assignee: Snap-on Technologies, Inc., Lincolnshire, Ill.

[21] Appl. No.: 596,947

[22] Filed: Feb. 26, 1996

[51] Int. Cl.[6] .................... B23P 19/04

[52] U.S. Cl. .................... 29/264

[58] Field of Search .................... 269/207, 208, 269/259, 261, 279, 280, 283, 284; 29/258, 263, 264; 411/377, 409, 429, 431, 435, 908

[56] References Cited

U.S. PATENT DOCUMENTS

| | | | |
|---|---|---|---|
| 1,468,334 | 9/1923 | Thomason | 29/264 |
| 1,505,232 | 8/1924 | Trautner . | |
| 1,782,303 | 11/1930 | Imlach . | |
| 2,190,585 | 2/1940 | Rhivevault | 269/261 |
| 2,467,982 | 4/1949 | Maris . | |
| 3,403,901 | 10/1968 | Servadio | 269/249 |
| 4,207,664 | 6/1980 | Zoula . | |
| 4,551,898 | 11/1985 | Provost . | |
| 4,555,337 | 11/1985 | Gargas | 210/238 |
| 4,694,569 | 9/1987 | Colvell et al. . | |
| 5,045,163 | 9/1991 | Sterling et al. . | |
| 5,099,726 | 3/1992 | Hsiao . | |
| 5,233,741 | 8/1993 | Maynard | 29/264 |
| 5,243,749 | 9/1993 | Shultz | 29/263 |
| 5,369,863 | 12/1994 | Hasenberg et al. | 29/264 |
| 5,544,992 | 8/1996 | Ciobanu et al. | 411/353 |

OTHER PUBLICATIONS

Photographs of Park Tools part No. CCP-1.
Photographs of Campagnolo crank arm puller tool.

*Primary Examiner*—Robert C. Watson
*Attorney, Agent, or Firm*—Emrich & Dithmar

[57] ABSTRACT

An apparatus is provided for removing a pedal crank arm from a bicycle axle end, wherein the axle end is received in a bore in the crank arm. The apparatus includes a tubular insert receivable in the bore of the crank arm and adapted to be fixed to the crank arm and a pressure screw receivable coaxially through the insert in threaded engagement therewith. The screw includes a bearing plug and a threaded member rotatably coupled to the bearing plug. The threaded member has a plug end and a drive end and a threaded outer surface portion in threaded engagement with the insert. The bearing plug has a bearing end frictionally engageable with the axle end to inhibit relative movement therebetween. The threaded member further includes coupling means on the drive end for removable coupling to an associate drive lever.

10 Claims, 2 Drawing Sheets

BICYCLE CRANK ARM PULLER

BACKGROUND OF THE INVENTION

1. Field of the Invention

This invention relates to hand tools and, more particularly, to tools for removing bicycle crank arms from the ends of axles.

2. Description of the Prior Art

Bicycle crank arms are typically provided with a compound bore through one end thereof, the inner portion of the bore being substantially square in transverse cross section and the outer portion of the bore being internally threaded, the two portions being separated by a radially extending shoulder. The square portion of the bore is press-fitted over the square end of the axle. One type of axle has an internally threaded female end and another type has a male end with an externally threaded stud projecting therefrom. In the former type the crank arm is locked in place on the axle end by a retaining screw having a flange which bears against the shoulder in the crank arm bore. In the latter type a flanged retaining nut engages the axle end stud.

The crank arm is often difficult to remove from the axle end. Accordingly, puller tools have been provided to assist in removal of the crank arm from the axle end. Such tools typically include an externally threaded tubular insert which threadedly engages in the threaded portion of the crank arm bore after the retaining nut or screw has been removed. The puller also includes a pressure screw which is threadedly engaged through the tubular insert and has a bearing end which bears against the axle end so that, as the pressure screw is rotated, it cooperates with the insert to separate the crank arm from the axle end.

The insert is typically provided with a hex portion which is engageable with an associated hex wrench or the like to facilitate engagement thereof in the crank arm bore. Similarly, the pressure screw may be provided with a polygonal end for engagement by another wrench. This commonly requires the use of two different wrenches.

An excellent puller tool that requires only one wrench to Operate is disclosed in U.S. Pat. No. 5,369,863. This tool includes a tubular insert which is received coaxially and threadedly engaged in a crank arm bore, a handle integral with the tubular insert to facilitate manual insertion of the insert into the crank arm bore, and a one-piece pressure screw receivable coaxially through the insert in threaded engagement therewith. The one-piece screw has a bearing end engagable with the axle end of the bicycle. After the tubular insert has been threaded into the crank arm bore, the pressure screw of this puller tool is threaded into the insert and the bearing end contacts the axle end. As the pressure screw travels axially inward of the insert, the insert pulls the crank arm off the axle end. However, because the pressure screw is one-piece, as it travels axially its bearing end rotates when it is in contact with the axle end. This rotation can cause galling, or other damage, to the pressure screw and/or the axle end. Eventually, this galling of the bearing end may irreparably damage it and require that the entire pressure screw be replaced.

SUMMARY OF THE INVENTION

It is a general object of the invention to provide an improved crank arm pulling tool which avoids the disadvantages of prior tools while affording additional structural and operating advantages.

An important feature of the invention is the provision of an apparatus for removing a crank arm from an axle end which is of relatively simple and economical construction.

A further feature of the invention is the provision of an apparatus of the type set forth which increases the durability of the tool by preventing damage to both the tool and the axle end.

In connection with the foregoing feature, another feature of the invention is the provision of an apparatus of the type set forth which works equally well with both male and female axle ends without damage to the axle end.

Yet another feature of the invention is the provision of an apparatus of the type set forth which is more economical to repair should it be damaged.

These and other features of the invention are attained by an apparatus for removing a pedal crank arm from a bicycle axle end, wherein the axle end is received in a bore in the crank arm. The apparatus includes a tubular insert receivable in the bore of the crank arm and adapted to be fixed to the crank arm and a pressure screw receivable coaxially through the insert in threaded engagement therewith. The screw includes a bearing plug and a threaded member rotatably coupled to the bearing plug. The threaded member has a plug end and a drive end and a threaded outer surface portion in threaded engagement with the insert. The bearing plug has a bearing end frictionally engageable with the axle end to inhibit relative movement therebetween. The threaded member further includes coupling means on the drive end for removable coupling to an associate drive lever.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
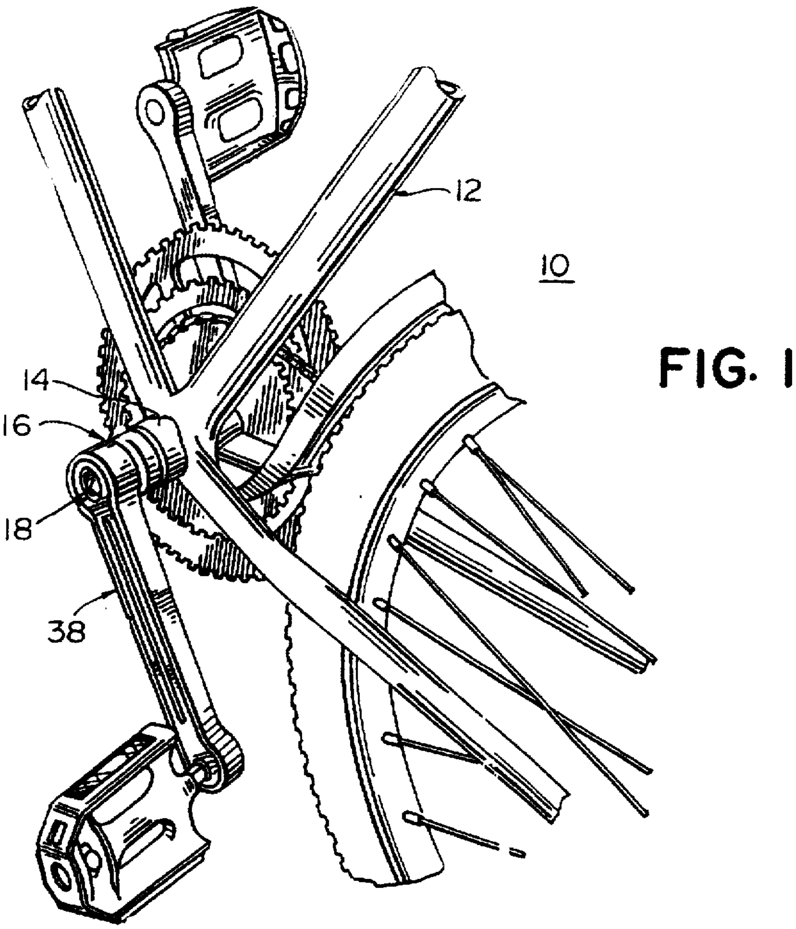
FIG. 1 is a fragmentary perspective view of a portion of a bicycle, including the bottom bracket with crank arms mounted on the ends of the axle.

Referring to FIG. 1, there is illustrated a bicycle 10 having a frame 12 with a bottom bracket 14. Mounted in the bottom bracket 14 is an axle 16 which has mounting ends 18 (one shown) which are substantially square in transverse cross section and respectively have internally threaded bores 20 formed axially therein (see FIG. 3). Referring to FIG. 4, it will be appreciated that the bicycle 10 could alternatively be provided with an axle 22 which is similarly provided with square mounting ends 24. However, in the case of the axle 22, each mounting end 24 is provided with an axially outwardly extending externally threaded stud 26. It is a significant aspect of the present invention that it is useful with either the female type of axle 16 or the male type of axle 22. In either event, the axle is typically provided with suitable bearings 28 (FIG. 4) in a known manner. The female type axle 16 is also provided with retaining screws 30 (one shogun in FIG. 3), which are respectively threadedly engageable in the internally threaded bores 20, the head of the screw 30 being provided with a radially outwardly extending annular flange 32. Similarly, the male type axle 22 is provided with nuts 34 (one shown in FIG. 4), respectively threadedly engageable with the studs 26, and each provided with a radially outwardly extending annular flange 36.

Referring to FIGS. 1–4, the bicycle 10 is also provided with a pair of pedal crank arms 38, which are respectively mounted on the opposite ends of the axle 16 or 22. The crank arms 38 are substantially identical in internal construction. Each has enlarged part-cylindrical ends with one and having a bore 40 extending therethrough, the bore 40 having an outer end 41, an inner end 42, a square portion 43 shaped and dimensioned for mating engagement with the square mounting end 18 or 24 of the associated axle 16 or 22, and an internally threaded portion 44. A radially inwardly extending shoulder 46 is disposed at the end of the internally threaded portion 44 and joins the internally threaded portion 44 to the square Portion 43. Formed through the opposite end of the crank arm 38 is an internally threaded pedal bore 48 which threadedly receives the stud end of an associated pedal 50 in a known manner.

Figure 2:
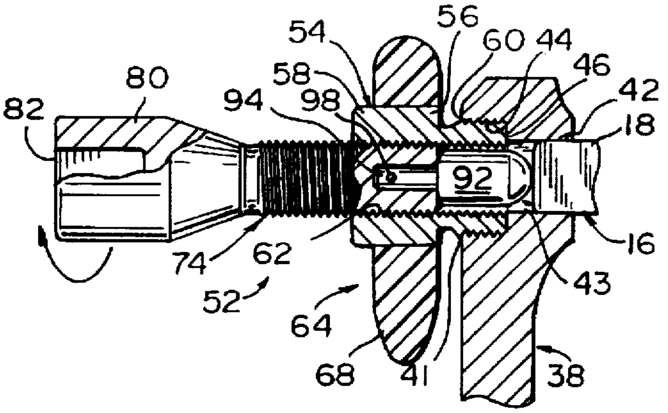
FIG. 2 is a fragmentary view in partial section of the connection between the crank arm and a female axle end and illustrating the use of a tool constructed in accordance with and embodying the features the invention.
Figure 3:
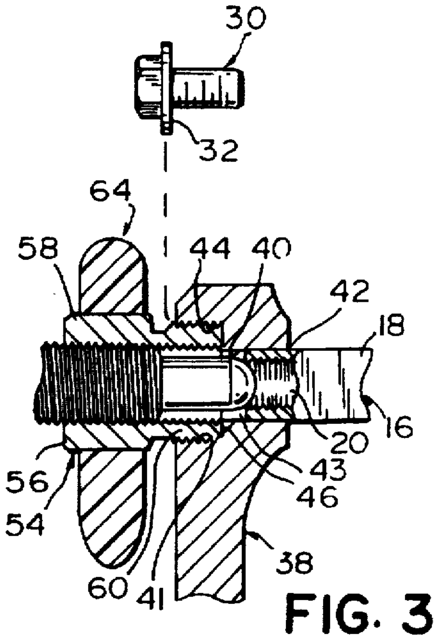
FIG. 3 is a fragmentary view similar to FIG. 2, illustrating the engagement of the tool with the female axle end, and illustrating the retaining screw in an exploded form.
Figures 4, 5, 6:
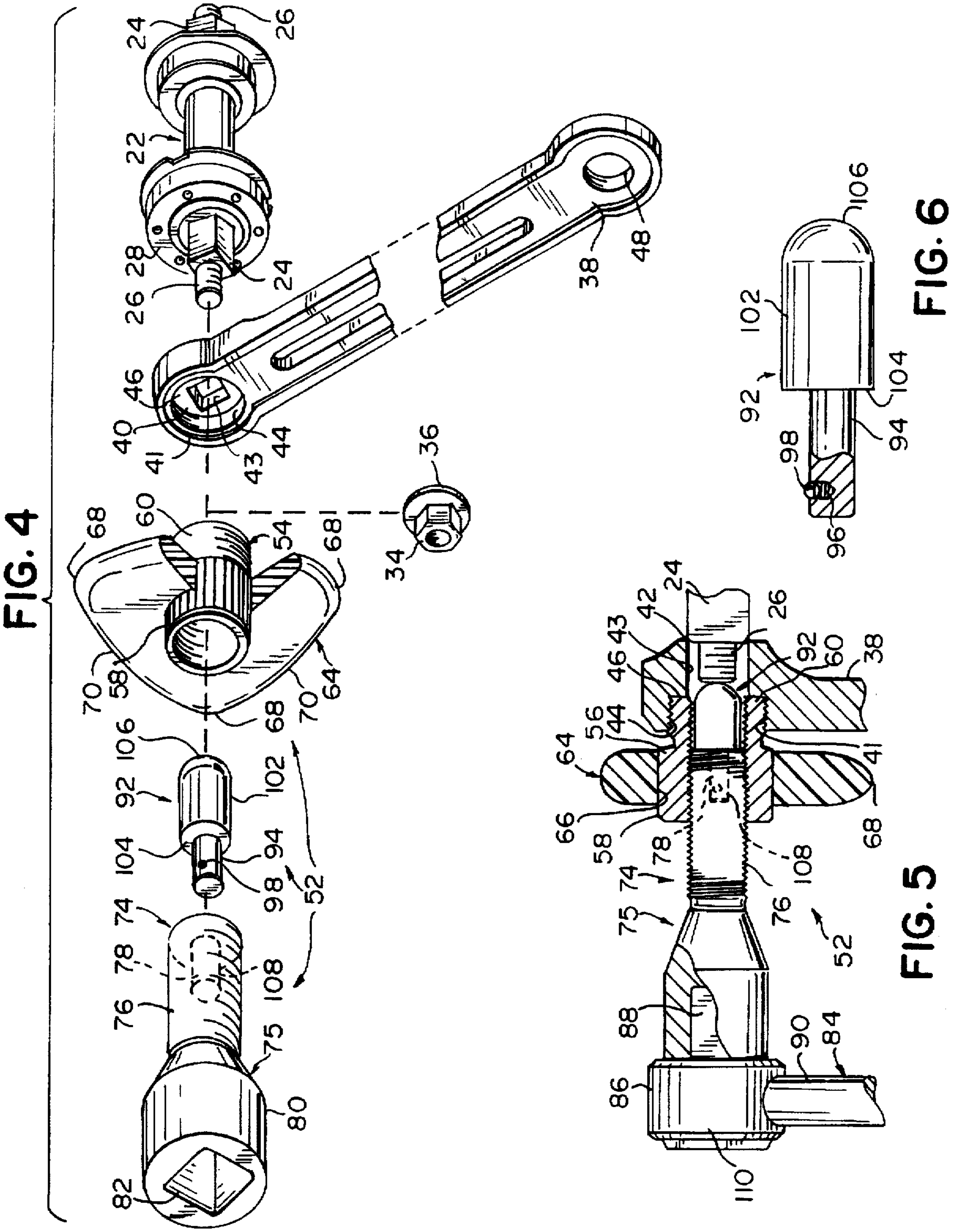
FIG. 4 is an enlarged, exploded, perspective view of a male-ended axle with associated crank arm and the tool of the present invention, with the tool insert handle illustrated in partial section.
FIG. 5 is a view similar to FIG. 2, illustrating the use of the tool of the present invention with the male-ended axle of FIG. 4, and illustrating the application of an associated drive lever.
FIG. 6 is an enlarged, elevational view in partial section of the bearing plug of the pressure screw of the tool of the present invention.

Referring to FIGS. 2 and 3, in the case of the female type axle 16, the square portion 43 of the crank arm bore 40 is fitted over the square mounting end 18 of the axle 16. The retaining screw 30 is then threadedly engaged in the internally threaded bore 20 of the axle end 18, the flange 32 of the screw 30 engaging the shoulder 46 in the crank arm bore 40 for securing the crank arm 38 in place on the axle end 18. Referring the FIG. 4, the crank arm 38 is mounted on the square mounting end 24 of the male type axle 22 in substantially the same manner, the nut 36 being threadedly engaged with the stud 26 so that the flange 36 engages the shoulder 46 of the crank arm bore 40 securely to hold the crank arm 38 in place.

Because of the substantial torque applied to the crank arms 38 in use, they tend to become wedged very tightly on the axle ends 18 or 28. Thus, removal of the crank arms 38 for servicing, repair or the like may be quite difficult. In accordance with the present invention, there is provided a puller tool 52 to assist in removing a crank arm 38 from the associated axle end 18 or 28. Referring to FIGS. 2–5, the tool 52 includes an insert 54 having a tubular body 56 having a knurled cylindrical outer surface portion 58 at one end thereof. The opposite end of the tubular body 56 is provided with external threads 60. The tubular body 56 is also provided with an internal thread 62 extending along its entire length. The external threads are adapted for threaded engagement with the internally threaded portion 44 of the crank arm bore 40.

The insert 54 is provided with a handle 64 which is generally triangular in shape and has a circular bore 66 formed centrally therethrough and adapted for press-fitted or molded engagement over the knurled cylindrical outer surface portion 58 of the insert 54. The handle 64 has three equiangularly spaced-apart lobes 68 which project radially outwardly from the insert 54, the lobes 68 being jointed by slightly convex arcuate sides 70. The handle 64 is dimensioned to be comfortably grasped in the hand of a user to facilitate threaded engagement of the insert 54 in the internally threaded portion 44 of the crank arm bore 40. The handle 64 is substantially identical to the handle of the puller tool described in commonly assigned U.S. Pat. No. 5,369,863, the disclosure of which is incorporated herein by reference.

The tool 52 also includes an elongated, composite two-piece pressure screw 74. The pressure screw 74 includes a drive member having an externally threaded shank 76 adapted for threaded engagement with the internal thread 62 of the insert 54. The drive member 75 has an axial bore 75 formed in the free end of the shank 76. The drive member 75 is provided with an enlarged drive end 80 disposed at the opposite end of the shank 76 having formed axially therein a drive socket 82 which is preferably substantially square in transverse crossesection and is adapted for engagement with an associated lever-type drive tool, e.g., a handle device such as a ratchet wrench, breaker bar or the like, in a known manner. For example, the pressure screw 74 may be used with a drive lever 84 (see FIG. 5) having an enlarged drive head 86 provided with a square drive lug 88 engageable in the socket 82. The drive lever 84 has a handle 90 which may be of any desired length. It will be appreciated that, if desired, the drive lever 84 may be provided with a ratchet drive.

As best seen in FIGS. 4–6, the composite pressure screw 74 also has an independent bearing plug 92 which has a cylindrical insert 94 which has a diameter and a length respectively slightly less than those of the axial bore 78 of the drive member 75. The cylindrical insert 94 also has a radial bore 96 formed therein. A ball 98, such as a steel ball 98, and a spring 100 are disposed in the bore 96. The outer surface area of the cylindrical insert 94 which surrounds the opening of the bore 96 is embossed to retain the ball 98 and the spring 100 in the bore 96. The spring 100 biases the ball 98 radially outwardly so that it normally projects beyond the outer surface of the insert 94.

As best seen in FIG. 6, the bearing plug 92 also has a substantially cylindrical bearing portion 102 integral with and having a larger diameter than the cylindrical insert 94, whereby an annular shoulder 104 is formed therebetween. The bearing portion 102 is generally bullet-shaped, having a distal bearing end 106 that is substantially part-spherical and has a diameter greater than that of the internally threaded bore 20 of the female axle 16 (FIGS. 2 and 3) and less than the smallest transverse dimension of the crank arm bore 40.

As seen in FIGS. 2–5, the cylindrical insert 94 is disposed in the bore 78 of the pressure screw 74 until the shoulder 104 bears against the end of the shank 76 and the ball 98 is biased against a generally cylindrical wall 108 defining the bore 78. The ball 98 biased against the cylindrical wall 108 frictionally maintains the cylindrical insert 94 within the bore 78 but still allows the bearing plug 92 and the drive member 75 to rotate relative to one another. A suitable lubricant is disposed between the shoulder 104 and the end of the screw shank 76. Alternatively, these abutting surfaces could be provided with a low-friction coating.

Referring to FIGS. 1–3, in use, when it is desired to remove a crank arm 38 from a female axle end 18 with the tool 52, the retaining screw 30 is first removed from the axle end 18 and then the insert 54 is threadedly engaged in the internally threaded portion 44 of the crank arm bore 40, as is indicated in FIG. 2, until the inner end of the insert 54 seats against the shoulder 46 in the crank arm bore 40. In this regard, the knurled cylindrical outer surface portion 58 and the handle 64 permit easy manual insertion of the insert 54 into the crank arm bore 40 without the use of auxiliary tools, such as wrenches and the like. For example, the smaller knurled cylindrical outer surface portion 58 of the insert 54 can be grasped between a user's thumb and fingers to start the insertion process and the handle 64 then can be grasped to finish the process. After the insert 54 is installed in place, the externally threaded shank 76 of the pressure screw 74 is threadedly engaged through the insert 54 until the bearing end 106 of the bearing plug 92 bears against the axle end 18. In this regard, it will be appreciated that the rounded shape of the bearing end 166 will permit it to seat in a self-centering fashion in the internally threaded bore 20 of the axle end 18 without damaging any of the threads. After the pressure screw 74 has been initially threaded into position, a suitable drive lever 110, such as a ratchet wrench, breaker bar, or the like, is engaged in the socket 82 of the pressure screw 74, as illustrated in FIG. 5, and then rotation of the pressure screw 74 is continued in the direction of the arrow in FIG. 2. It will be appreciated that, as the pressure screw 74 travels axially inwardly of the insert 54, the insert 54 pulls the crank arm 38 off of the axle end 18 in known manner.

It is a significant aspect of the present invention that after the bearing end 106 of the bearing plug 92 contacts and engages the axle end 18, the friction therebetween overcomes the friction between the ball 98 and the wall 108 and the friction between the shoulder 104 and the end of the shank 76, so that the bearing plug 92 does not rotate with respect to the axle end 18. Rather, when the externally threaded shank 76 is further rotated to move the composite pressure screw 74 axially inwardly of the insert 54, it rotates relative to the bearing plug 92. This non-movement of the plug 92 prevents damage, such as galling, to either the bearing end 106 or the axle end 18. Additionally, if the bearing plug 92 does become damaged, it alone, rather than the entire pressure screw 74, can be replaced because the pressure screw 76 is of a two-piece construction. Further, the bearing portion 102 of the bearing plug 92 has a length as measured from the annular shoulder 104 to the bearing end 106 that is greater than the distance from the shoulder 46 to the inner end 42 of the crank arm bore 40. This insures that the crank arm 38 will be freed from the axle before the larger diameter threaded shank 76 of the drive member 75 reaches the square portion 43 of the crank arm bore 40, so as to prevent damage to the faces of the square portion 43.

Operation with a male axle 22 is substantially the same. First, the nut 34 is removed and then the tool 52 is installed in place on the crank arm 38 in the same manner as was described above. The operation is the same, except that in this case the bearing end 106 of the bearing plug 92 of the pressure screw 74 engages against the distal end of the axle stud 22 (see FIG. 5), which is typically cupped or slightly concave so as to provide surface contact with the bearing end 106. This engagement, like the engagement of the bearing end 106 with the axle end 18 of the female axle 16, prevents the rotation of the bearing plug 92 relative to the axle stud 26 to prevent damage to either.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for removing a pedal crank arm from a bicycle axle end, wherein the axle end is received in a bore in the crank arm, the apparatus comprising:

a tubular insert receivable in the bore of the crank arm and adapted to be fixed to the crank arm; and a pressure screw receivable coaxially through the insert in threaded engagement therewith, the screw including a bearing plug and a threaded member rotatably coupled to the bearing plug, the threaded member having a plug end and a drive end and a threaded outer surface portion in threaded engagement with the insert and an axial bore opening at the plug end, the bearing plug having a bearing end frictionally engageable with the axle end to inhibit relative movement therebetween, the threaded member further including coupling means on the drive end for removably coupling the threaded member to an associate drive lever, wherein the bearing plug includes a cylindrical insert coaxially disposed in the axial bore of the pressure screw and a plug portion having a substantially cylindrical portion integral with the cylindrical insert and disposed outside of the axial bore of the pressure screw and having a diameter greater than that of the cylindrical insert.

2. The apparatus of claim 1, wherein the threaded member includes a generally cylindrical wall defining the axial bore of the pressure screw and the cylindrical insert includes a non-axial bore and a ball disposed in the non-axial bore biased against the cylindrical wall to retain the insert in the axial bore of the pressure screw.

3. The apparatus of claim 2, wherein the ball is biased against the cylindrical wall by a spring.

4. The apparatus of claim 1, wherein the bearing end is convex.

5. The apparatus of claim 4, wherein the bearing end is substantially part-spherical in shape.

6. The apparatus of claim 5, wherein the bicycle axle end has an internally threaded axial bore formed therein, the bearing end of the bearing plug having a diameter greater than the diameter of the internally threaded axial bore of the axle end.

7. The apparatus of claim 1, wherein the tubular insert has a threaded outer surface portion threadedly engaged in the crank arm bore.

8. The apparatus of claim 1 wherein the tubular insert includes a threaded outer surface threadedly engaged in the crank arm bore and a generally cylindrical knurled outer surface portion integral with the threaded outer surface portion, whereby a user may grasp the knurled outer surface portion to facilitate manual insertion of the tubular insert in the crank arm bore.

9. The apparatus of claim 8, further comprising an enlarged handle disposed on and projecting radially outwardly from the knurled outer surface portion to further facilitate manual insertion of the tubular insert in the crank arm bore.

10. The apparatus of claim 1, wherein the crank arm bore has first and second ends and a threaded portion running axially from the first end to an end point disposed between the first and second ends, wherein the plug portion has an axial length greater than the distance between the end point of the threaded portion and the second end of the crank arm bore.

* * * * *